Nov. 26, 1963
F. CLARKE
3,111,812
SUBMERGIBLE PIPELINE CAISSON
Filed Sept. 9, 1960
5 Sheets-Sheet 1
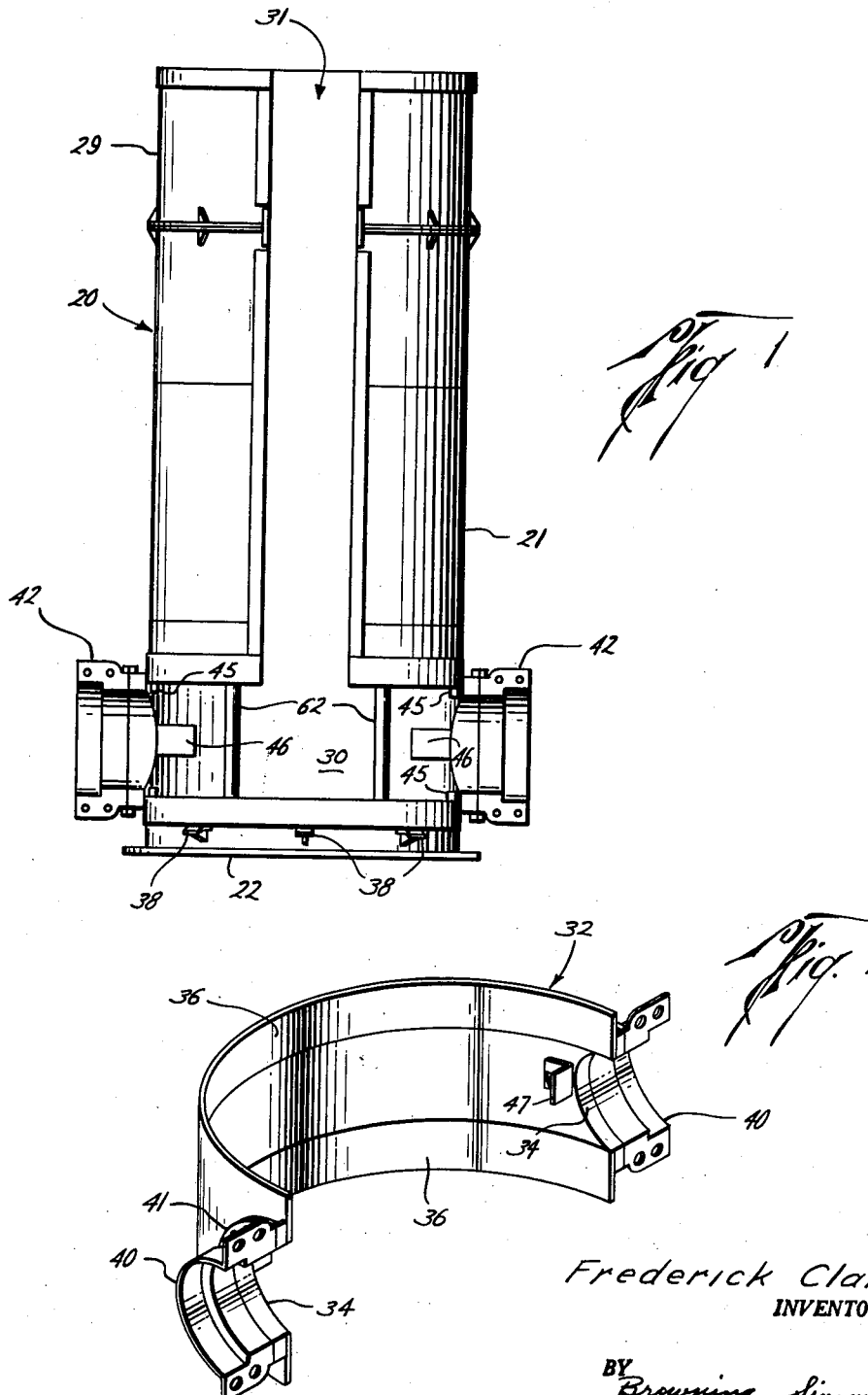
Frederick Clarke
INVENTOR.
BY
ATTORNEYS

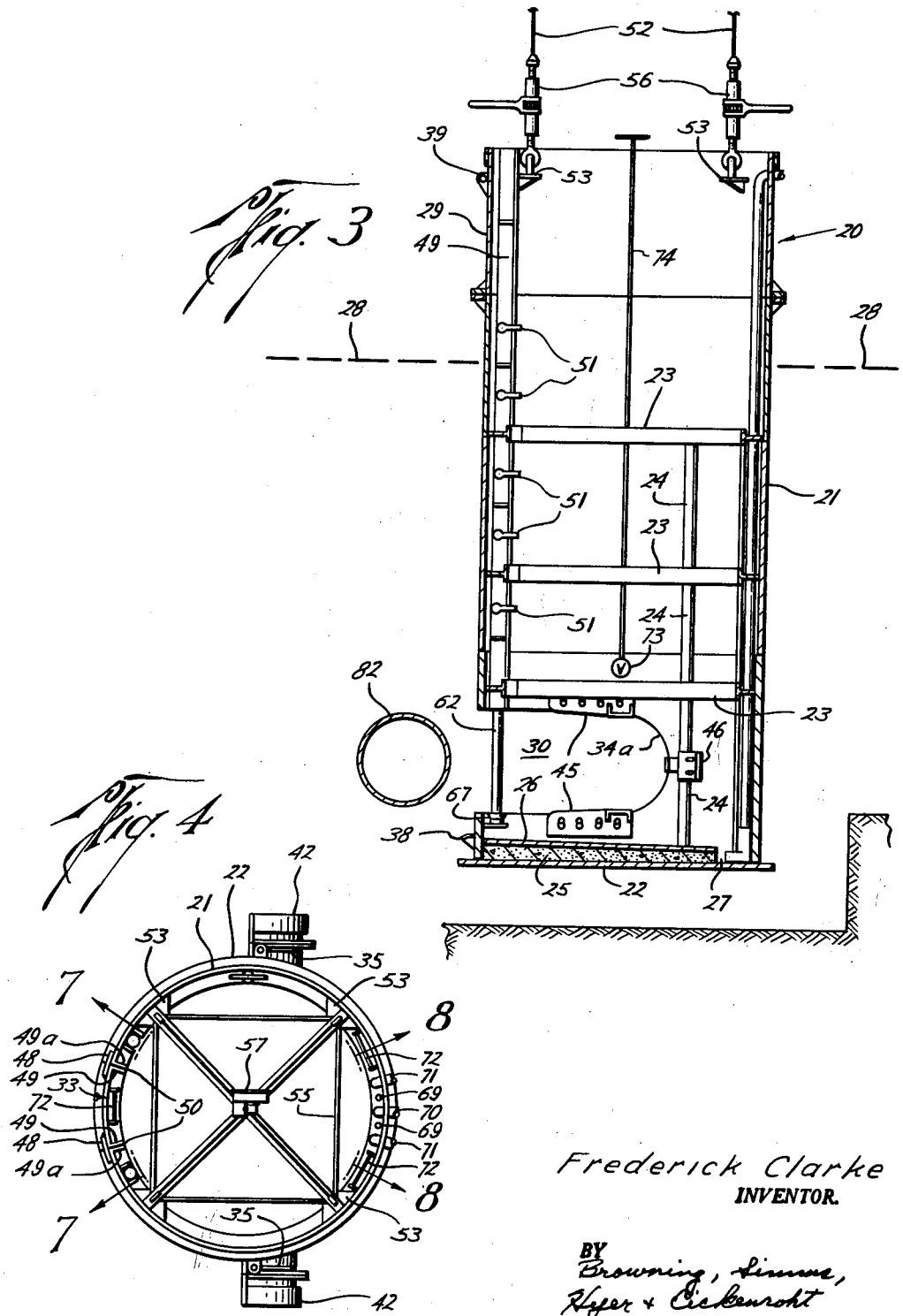

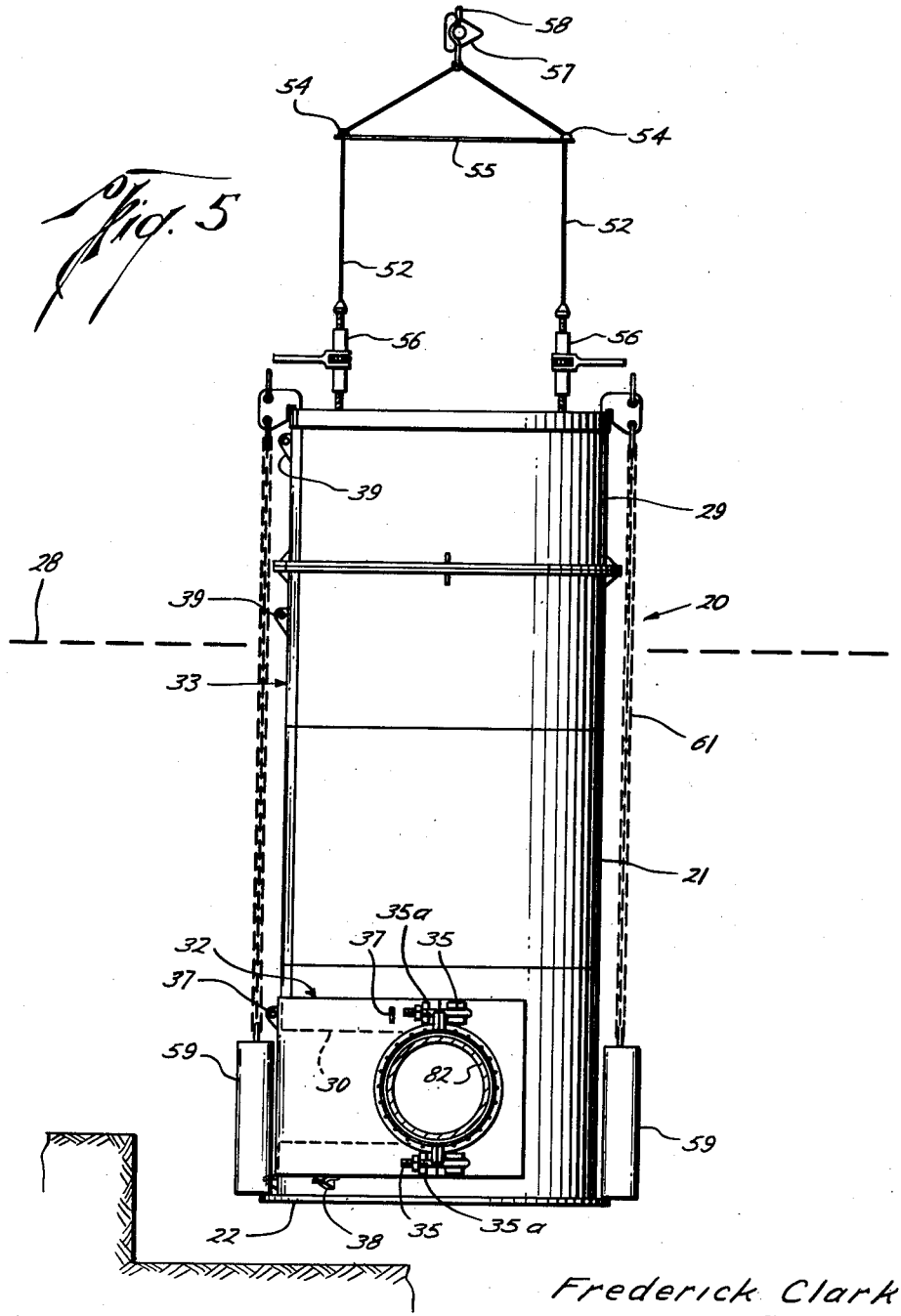

Nov. 26, 1963  F. CLARKE  3,111,812
SUBMERGIBLE PIPELINE CAISSON
Filed Sept. 9, 1960  5 Sheets-Sheet 4
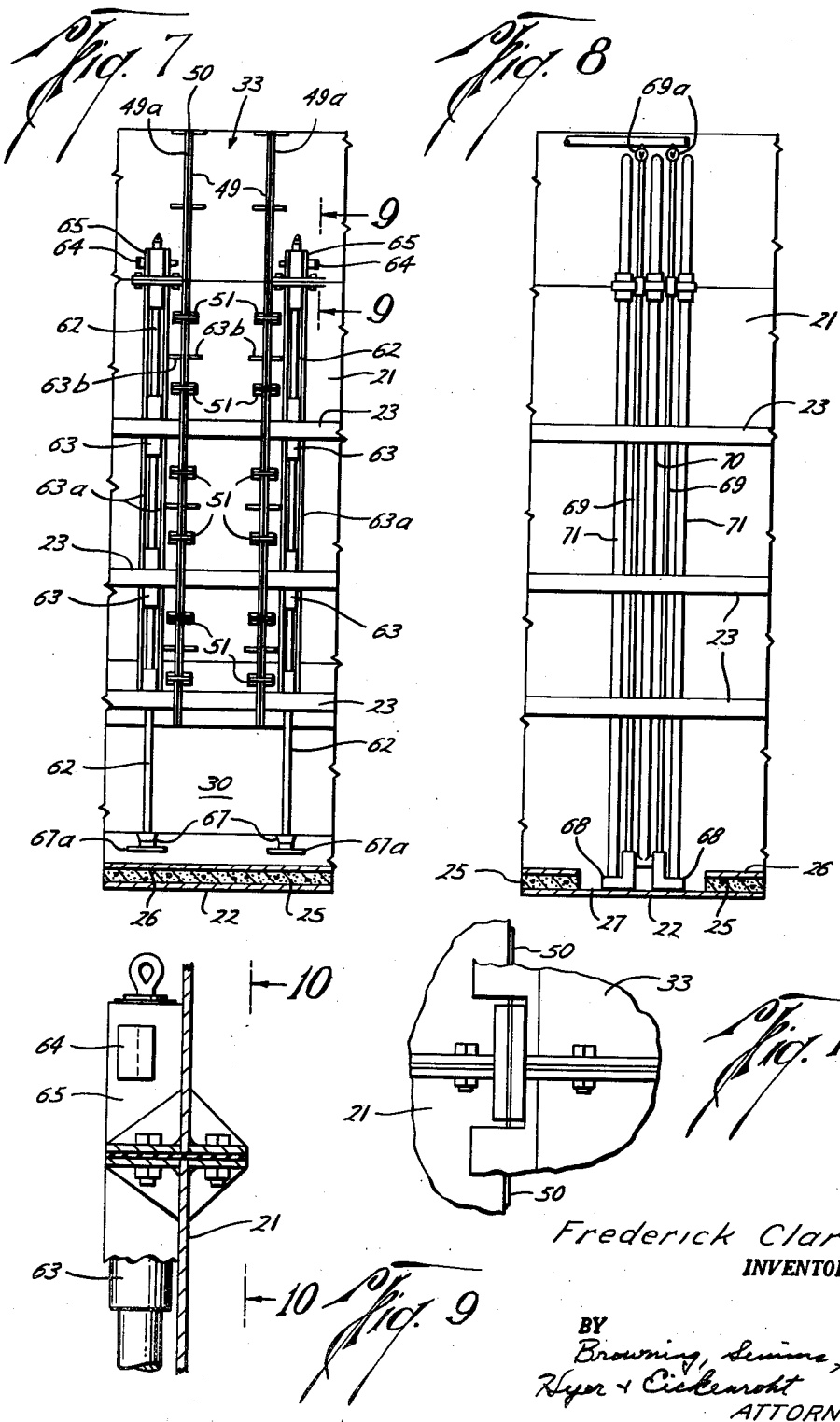
Frederick Clarke
INVENTOR.
BY
Browning, Simmons,
Hyer & Cickenroht
ATTORNEYS

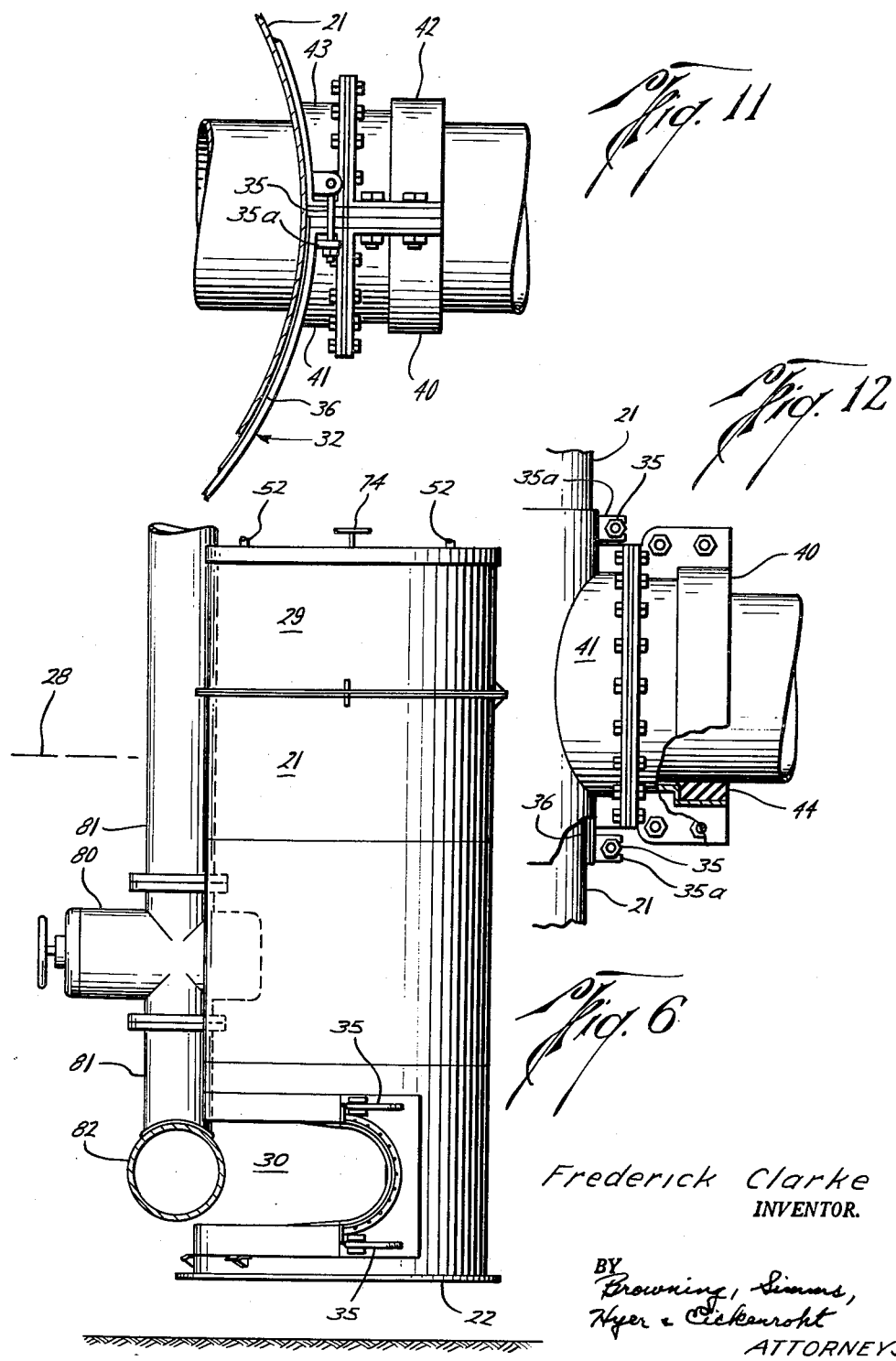

United States Patent Office 3,111,812
Patented Nov. 26, 1963

3,111,812
SUBMERGIBLE PIPELINE CAISSON
Frederick Clarke, P.O. Drawer 1345, Oil Center Station,
Lafayette, La.
Filed Sept. 9, 1960, Ser. No. 55,084
6 Claims. (Cl. 61—81)

This invention relates to apparatus for performing underwater operations on a pipeline. More particularly, it relates to an improved submergible caisson for performing maintenance and construction work on a submerged pipeline.

Frequently it is necessary to perform in place operations on an underwater pipeline. Such operations may include maintenance work in the nature of repairs to the pipeline and associated equipment or may include construction work in the nature of modifications to the pipeline such as connecting valves, risers, and the like, thereto. In any event, in order to perform such operations in a safe, efficient and rapid manner, it is considered desirable to provide means for sealing off water from the pipeline to expose it and provide access thereto, preferably from the surface of the water.

Apparatus presently known and used for this purpose have many disadvantages and undesirable features. For example, certain prior types of submerged pressurized repair chambers having closed tops and open bottoms are considered objectionable not only because of their limited field of utility but also because they are difficult and even dangerous to use under some conditions.

That is, these submerged pressurized repair chambers cannot be used satisfactorily for performing construction work such as connecting valves, risers and the like to the pipeline, particularly when these elements extend a substantial distance above the pipeline and even to the surface of the water as is frequently the case. Further, these submerged devices do not expose the pipeline and provide access thereto from the surface of the water to permit supplies, equipment and workmen to be moved quickly and easily therebetween during the repair operations. In addition, these submerged open bottom pressurized chambers are not water-tight nor do they provide a solid platform upon which the workmen can stand; therefore, the workmen are frequently required to wear diving equipment while working on submerged pipelines in these devices.

Certain other types of submarine pipeline repair bells having open tops and closed bottoms overcome some of the difficulties and disadvantages of the aforesaid types having closed tops and open bottoms, but have other undesirable features and characteristics. For example, one device having an open top and closed bottom does not have a unitary body and must be lowered in sections to the submerged pipeline and assembled in place thereabout before water may be evacuated from the repair bell to expose the pipeline. This is a difficult and time consuming operation, particularly when the several sections of the device are large and heavy as is frequently the case. Further, the entire weight of the last-mentioned apparatus must be supported by the pipeline prior to evacuation of water from the apparatus, and the entire upward pull due to the buoyancy of the equipment after evacuation of water must be sustained by the pipeline. These upward and downward forces can overstress the pipeline and cause it to leak or even rupture.

An object of this invention is to provide apparatus for performing underwater operations on a pipeline which obviates the foregoing difficulties and disadvantages.

Another object of the invention is to provide means for sealing off water from a submerged pipeline to expose it and provide access thereto from the surface of the water which can be quickly and easily moved into and out of landed position on the pipeline.

Another object of the invention is to provide an improved submergible caisson for performing underwater operations on a pipeline, the caisson having a unitary body construction but which nonetheless can be moved quickly and easily into and out of landed position on a submerged pipeline.

Another object of the invention is to provide an improved submergible caisson for performing maintenance and construction work on a submerged pipeline which can be moved into and out of landed positions on a submerged pipeline without subjecting it to undue stresses and strains.

Another object of the invention is to provide an improved submergible caisson for performing in place operations on underwater pipelines which can be moved between positions landable to one side of a pipeline and landed in surrounding relationship thereto to seal off the water from the pipeline and provide access thereto from the surface of the water.

Other objects, advantages, and features are inherent and will become apparent upon a consideration of the specification, claims and attached drawings.

These and other objects and advantages are accomplished according to this invention by a submergible caisson comprising a vessel closed at its lower end and having an opening in its side wall for receiving a pipeline for lateral movement therethrough between positions outside of the vessel and landed therein, upon movement of the vessel between positions landable to one side of the pipeline and landed in surrounding relationship thereto. Closure means is provided normally covering said side wall opening in the vessel and removable therefrom to uncover the opening to permit the vessel to be moved laterally between said landable and landed positions.

Exemplary forms of the apparatus of this invention with which the foregoing objects and advantages can be accomplished are shown in the attached drawings. In the drawings, wherein like characters designate like parts throughout the several views:

FIG. 1 is a side view of a submergible caisson constructed according to this invention showing the transverse pipeline-receiving slot and the longitudinal riser-receiving slot uncovered;

FIG. 2 is a perspective view of the transverse belt which normally covers the transverse pipeline-receiving slot;

FIG. 3 is a cross-sectional view of the caisson suspended in a partially submerged condition in a landable position to one side of a submerged pipeline;

FIG. 4 is a top view of the apparatus of FIG. 3;

FIG. 5 is a side view showing the caisson in a landed position on the submerged pipeline;

FIG. 6 is a side view of the caisson being moved out of its landed position after a valve and riser have been connected to the pipeline;

FIG. 7 is a view taken along the line 7—7 of FIG. 4;

FIG. 8 is a view taken along the line 8—8 of FIG. 4;

FIG. 9 is a view taken along the line 9—9 of FIG. 7;

FIG. 10 is a view taken along the line 10—10 of FIG. 9;

FIG. 11 is an enlarged top view of a portion of the submergible caisson of this invention showing the manner in which the pipeline is landably received therein; and FIG. 12 is a side view of the structure of FIG. 11.

Referring now to the drawings, it will be seen that in one of its forms, the submergible caisson of this invention may comprise a cylinder 20 closed at its lower end and having its side wall 21 and bottom wall 22 integrally joined to provide a substantially water-tight unitary body structure. As best seen in FIG. 3, side wall 21 may be reinforced with girth stiffeners 23 and vertical stiffeners 24, and bottom wall 22 may be provided with a concrete floor 25 topped with a non-skid tread 26 which slopes into a sump 27 at one side of the cylinder. As will be seen, this provides a safe, solid and substantially water free work platform upon which workmen can stand while performing the operations on the pipeline.

As previously mentioned, an opening is provided in the side wall of the caisson for receiving the pipeline for lateral movement therethrough, adapting the caisson to be moved laterally between positions landable to one side of the pipeline and landed in surrounding relationship thereto. In the apparatus illustrated, which is adapted for use both in maintenance and construction work, such side wall opening may comprise a transverse pipeline-receiving slot 30 and a longitudinal riser-receiving slot 31. Pipeline-receiving slot 30 is preferably formed sufficiently large to accommodate the largest sized pipeline expected to be encountered, and is disposed in a horizontal plane spaced above bottom wall 22. Riser-receiving slot 31 likewise is formed sufficiently large to permit passage therethrough of the largest valve, riser, or the like expected to be encountered, and preferably extends vertically upwardly along wall 21 between transverse slot 30 and the top of the wall. Thus, slots 30 and 31 together define an inverted T-shaped opening in side wall 21 for receiving the pipeline and riser for lateral movement through the cylinder wall during landing operations.

Pipeline-receiving slot 30 and riser-receiving slot 31 are normally sealably covered by suitable closure means such as transverse belt 32 and longitudinal door 33, respectively, belt 32 and door 33 preferably being individually releasably connected to cylinder 20 so that they may be separately removed to uncover their respective openings to permit the cylinder to be moved into and out of its landed positions.

As best seen in FIGS. 2 and 5, transverse belt 32 is sized and shaped to sealably cover pipeline-receiving slot 30 and may be releasably connected to cylinder 20 by suitable means such as swing bolts 35 carried by the cylinder which releasably engage brackets 35a carried by the belt. Seals 36 on belt 32 provide a water-tight seal between the belt and cylinder when swing bolts 35 are tightened to connect the belt to the cylinder. Belt 32 may be moved into and out of mounted position on cylinder 20 by any suitable means, for example, as by a line from the surface (not shown) fastened to lifting lugs 37, the belt being positioned and supported over slot 30 during connection and disconnection by locating brackets 38.

A semi-circular slot 34 is provided at each inner edge of belt 32 which, together with the inner edges 34a of pipeline receiving-slot 30, define opposed openings in the side wall of the cylinder when the belt is attached thereto for landably receiving the pipeline (FIG. 5). As previously mentioned, these opposed openings should be sufficiently large to accommodate the largest pipeline expected to be encountered. Semi-circular collars 40 are releasably connected to flanges 41 on transverse belt 32 and mating semi-circular collars 42 are releasably connected to flanges 43 on cylinder 20. As best seen in FIGS. 5, 11 and 12, when the belt is connected to the cylinder, the assembled collars surround the opposed openings and provide means reducing the effective size of the opening. Thus, knowing the size of the pipeline, collars can be selected which will provide opposed openings of desired size for landably receiving the pipeline. Seals 44 in the assembled collars provide a water-tight seal about the opposed openings between the cylinder and pipe at the points of penetration of the pipeline through the cylinder.

Means is provided for locating the pipeline in its landed position in the cylinder. Such means may comprise two pairs of opposed tapered plates 45 carried by side wall 21 spaced axially apart near each of the inner edges of slot 30. As shown, (FIGS. 1 and 3) these plates are adjustable to extend into slot 30 a variable distance to thereby slidably engage the pipeline and center it axially of the landing openings. Stop brackets 46, carried by side wall 21 at each inner edge 34a of slot 30, and corresponding stop-plates 47, carried by belt 32 at each of its inner edges (FIG. 2), are adjustable laterally of the cylinder to engage the pipeline and center it laterally of the landing openings. Thus, it will be seen that the pipeline is located and held firmly in its landed position by the guide plates and stop brackets when belt 32 is connected to the cylinder, the guide plates and stop brackets being adjustable to extend into the slot 30 a variable distance to accommodate the different sized pipes which may be encountered.

Referring now to FIGS. 3, 4 and 7, it will be seen that longitudinal door 33 is sized and shaped to sealably cover riser-receiving slot 31 and has laterally extending flanges 48 and inwardly extending flanges 49 along its edges. Flanges 48 engage the outer face of side wall 21 while flanges 49 cooperate with corresponding flanges 49a, which extend inwardly from side wall 21 along the edges of slot 31, when the door is in mounted position to sealably cover slot 31. Suitable means such as C clamps 51 may be provided to releasably connect the door to the cylinder and to draw flanges 49 and 49a together against seals 50 positioned therebetween to insure a water-tight seal between the door and cylinder. Lifting lugs 39 may be provided for removing the door upon release of C clamps 51 to permit a riser or the like to be moved through slot 31 when the cylinder is moved laterally between its landed and landable positions.

As is well known, submerged pipelines frequently are inclined rather than horizontal and in these situations it is considered desirable to provide means for tilting the cylinder in order to align pipeline-receiving slot 30 with the inclined pipeline. This permits the cylinder to be moved between its landable and landed positions without subjecting the pipeline to undue stresses and strains and also centers the pipeline in the opposed landing openings when the cylinder is in its landed position on the pipeline to permit formation of a water-tight seal between the pipeline and cylinder. For this purpose means is provided for tiltably suspending the cylinder in a partially submerged condition and for moving it laterally between its landable and landed positions. Such tiltable suspending means may comprise a plurality of support lines 52 connected at one of their ends 53 to side wall 21 at angularly spaced-apart intervals thereabout and connected at their other ends 54 to a spreader-bar 55 which is in turn connected to a drag line 58 and derrick or the like (not shown). Means such as ratchet driven turnbuckles 56 are provided in support line 52 to separately adjust the effective length of these lines and thereby tilt the suspended cylinder in the direction required in order to align pipeline-receiving-slot 30 with the inclined pipeline.

In order to avoid subjecting the pipeline to undue stresses and strains during evacuation and flooding of the landed cylinder, and to maintain it in an upright position, it is desired to provide stabilizing means to control the buoyancy of the cylinder and maintain a predetermined minimum effective downward pull on drag line 58. Such stabilizing means may comprise a weight gage 57 connected to drag line 58 and a plurality of external weights 59 releasably connectible to cylinder 20 as by hooks 60 and chains 61. As will be understood, the readings on weight gage 57 indicate the net effective downward pull of the cylinder on drag line 58. Thus, by observing the weight gage and adding and removing weights 59 as required, a predetermined minimum downward pull may be maintained on drag line 58 during evacuation and flooding of the landed cylinder sufficient to stabilize the cylinder in an upright position and at the same time avoid subjecting the pipeline to undue stresses and strains due to excessive upward or downward forces on the pipeline.

Although cylinder 20 is of rugged construction, it is nonetheless desirable to provide means for reinforcing side wall 21 across pipeline-receiving slot 30, particularly since stabilizing weights 59 may increase the compressive force on slotted wall 21 a substantial amount when performing operations on pipelines submerged in deep water. Such reinforcing means may comprise a pair of columns or studs 62 carried by wall 21 and movable axially therealong between positions supporting across slot 30 (FIGS. 1, 3 and 7) and released above the slot (FIG. 6), to permit lateral movement of the pipeline through the slot during landing operations. As best seen in FIG. 7, columns 62 are slidably received in collars 63 which are carried by girth stiffeners 23. Vertical stiffeners 63a, backed up by brackets 63b, provide additional strength along the length of the columns. At their upper ends above slot 30, columns 62 may be releasably connected to side wall 21 as by pins 64 which are received through mating slots formed through the columns and fastening plates 65 (FIG. 9). At their lower ends, below slot 30, columns 62 may be releasably engaged to side wall 21 as by a sliding fit in sockets 67 which are connected to wall 21 by brackets 67a (FIGS. 3 and 7). Thus, by removing pins 64, the columns can be released from their supporting position across slot 30 and raised above the slot to permit a pipeline to be moved therethrough. Columns 62 are normally in their supporting positions as shown in FIGS. 1, 3 and 7, and are moved to the released position of FIG. 6 only during actual landing operations.

Means is provided for evacuating water from the landed cylinder to expose the pipeline and provide access thereto from the surface of the water. As shown, such evacuating means may comprise a pair of air driven sump pumps 68 located in sump 27. Air is introduced at a controlled rate into pumps 68 through air-inlet lines 69 and control valves 69a, and the air is exhausted therefrom through exhaust line 70. Water delivered from the pumps is discharged from the cylinder through discharge lines 71. It will be seen that lines 69, 70 and 71, and control valves 69a, are preferably disposed between the inner surface of side wall 21 and the inner surfaces of the girth and longitudinal stiffeners. Ladders 72 and other auxiliary equipment such as oxygen and welding inlet lines (not shown) may be located in a like manner. This not only provides an unobstructed working area within the cylinder, but also protects such auxiliary equipment from possible damage.

The pressure of the water acting externally of the cylinder tends to hold the transverse belt and longitudinal door in position and to tighten the seals to reduce leaking when the cylinder is evacuated of water. Thus, it is desirable to provide means for flooding the cylinder with water upon completion of the operations to equalize the pressure across the cylinder so that the belt and door may be more easily removed. Further, it is desirable that such flooding means shall be operable from the surface of the water to permit positive control of the flooding operation and coordination of the stabilizing operation. Such flooding means may comprise a buoyancy control valve 73 located in wall 21, valve 73 being operable from the surface of the water by suitable means such as by extended valve stem 74.

The sequence of operations for carrying out a typical construction job, such as mounting a valve 80 and riser 81 on a submerged pipeline 82, will be helpful in understanding the operation of the submergible caisson of this invention. First, soil is removed from the pipeline to provide an excavation thereabout of sufficient size to permit the caisson to be suspended in a partially submerged condition to one side of the pipeline and to be moved laterally between its landable and landed positions. transverse belt 32 is generally removed so that the cylinder will flood rapidly when it is lowered into landable position. Knowing the size of pipeline 82, collars of the desired size are selected and connected to the belt and cylinder, and plates 45 and stops 46 and 47 are adjusted to guide and locate the pipeline as it moves into the cylinder during the landing operation. At this point, valve 80 and riser 81 have not yet been connected to the pipeline. Thus, longitudinal door 33 is in its mounted position sealably covering riser-slot 31.

When the adjustments have been made and the excavation is completed, cylinder 20 is lowered on drag line 58 into its landable position to one side of pipeline 82 as shown in FIG. 3. Turnbuckles 56 are adjusted as required to tilt the cylinder and align pipeline receiving-slot 30 with the pipeline. Pins 64 are then removed and columns 62 are raised to their released position above pipeline receiving-slot 30 so that cylinder 20 may be moved laterally from its landable position (FIG. 3) to its landed position (FIG. 5). Columns 62 are then returned to their supporting positions across slot 30.

When the cylinder is in its landed position on the pipeline, transverse belt 32 is lowered into mounting position over transverse slot 30 and is connected to the cylinder by divers. At the same time, seals 44 are inserted in the collars surrounding the pipeline at its points of penetration through the cylinder. When this has been accomplished (valve 73 being closed), sump pumps 68 are operated to evacuate the water from the cylinder. During this operation, weight gage 57 is observed, and weights 59 are added as required to maintain a predetermined minimum downward pull on drag line 58.

When the cylinder has been evacuated and the pipeline exposed, the workmen may descend to the pipeline from the surface of the water and connect valve 80 and riser 81 thereto by any well known means. When the connection operation has been completed and all of the workmen and materials have been removed from the cylinder, C clamps 51 are removed from longitudinal door 33 and flooding-valve 73 is opened to flood the cylinder with water. During this operation, weights 59 are removed as required to maintain the predetermined minimum downward pull on drag line 58. When the cylinder has been flooded with water and the pressure across the cylinder wall has been equalized, divers release swing-bolts 35 disconnecting belt 32. The belt and door are then removed to uncover their respective slots. When the slots have been uncovered, columns 62 are again raised to their released position above slot 30 and the cylinder is moved laterally out of its landed position (FIG. 6).

From the foregoing it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A submergible caisson for underwater operations on a pipeline which may have a riser or the like connected thereto comprising, in combination, a vessel closed at its lower end and having an opening formed in its side wall having a horizontally elongated part for receiving said pipeline and a part extending upwardly from said horizontally elongated part for receiving said riser for lateral movement of said pipeline and riser therethrough between positions outside of the vessel and landed therein; and closure means removably mounted on said vessel normally covering said side opening and removable therefrom to uncover the opening to permit said lateral movement of the pipeline and riser therethrough upon movement of the vessel between positions landable to one side of the pipeline and riser and landed in surrounding relationship thereto.

2. A submergible caisson for underwater operations on on a pipeline which may have a riser or the like connected thereto comprising, in combination, a cylinder closed at its lower end and having its side and bottom walls integrally joined to provide a unitary structure; a transverse pipeline-receiving slot formed about the side wall of said cylinder spaced above the closed end thereof; a longitudinal riser-receiving slot formed along said side wall extending upwardly from said transverse slot; closure means including a transverse belt and a longitudinal door releasably connected to said cylinder normally sealably covering said transverse slot and said longitudinal slot, respectively, said belt and door being independently removable to selectively uncover their respective slots to permit said pipeline and riser to be moved through their respective slots between positions outside of the cylinder and landed therein upon movement of the cylinder laterally between positions landable to one side of said pipeline and riser and landed in surrounding relationship thereto.

3. A submergible caisson for underwater operations on a pipeline which may have a riser or the like connected thereto comprising, in combination, a cylinder closed at its lower end and having its side and bottom walls integrally joined to provide a unitary structure; a transverse pipeline-receiving slot formed about the side wall of said cylinder in a plane spaced above the closed end thereof; a longitudinal riser-receiving slot formed along said side wall extending between said transverse slot and the top of the side wall; means for suspending said cylinder in a partially submerged condition and for moving it laterally between positions landable to one side of said pipeline and riser and landed in surrounding relationship thereto; closure means including a transverse belt and a longitudinal door releasably connected to said cylinder normally sealably covering said transverse pipeline-receiving slot and said longitudinal riser-receiving slot, respectively, and individually removable therefrom to permit the pipeline and riser to be moved laterally through the side wall of the cylinder between positions outside of the cylinder and landed therein upon movement of the cylinder laterally between said landable and landed positions; means for evacuating water from said cylinder to expose said landed pipeline and riser for operations thereon; means for flooding said cylinder with water upon completion of said operations; stabilizing means for controlling the buoyancy of said cylinder during evacuation and flooding thereof; and reinforcing means carried by said cylinder releasably supporting said side wall against deformation.

4. A submergible caisson according to claim 3 wherein said reinforcing means comprises, a column adjacent each edge of said longitudinal slot mounted for axial movement therealong between positions supporting across said transverse slot and released above the transverse slot; and means for releasably fastening said columns to said side wall against said axial movement for maintaining the columns in their supporting positions across the transverse slot and releasable to axial movement to permit the columns to be moved to their raised position above the transverse slot.

5. A submergible caisson for underwater operations on a pipeline which may have a riser or the like connected thereto comprising, in combination, a cylinder closed at its lower end and having its side and bottom walls integrally joined to provide a unitary structure; a transverse pipeline-receiving slot formed about the side wall of said cylinder in a horizontal plane spaced above the closed end thereof, said transverse slot being sized to slidably receive the largest pipe expected to be encountered during said underwater operations; a longitudinal riser-receiving slot formed along said side wall extending vertically between the said transverse slot and the top of said side wall; means for tiltably suspending said cylinder in a partially submerged condition and for moving it laterally between positions landable to one side of said pipeline and riser and landed in surrounding relationship thereto; closure means including a transverse belt and a longitudinal door releasably connected to said cylinder normally sealably covering said transverse pipeline-receiving slot and said riser-receiving slot, respectively, and individually removable therefrom to selectively uncover their respective slots to permit the pipeline and riser to be moved laterally through the side wall of the cylinder between positions outside of the cylinder and landed therein upon movement of the cylinder between said landable and landed positions; means operable from the surface of the water for evacuating water from said cylinder to expose said landed pipeline and riser for operations thereon; means including a valve in the side wall of the cylinder operable from the surface of the water for flooding said cylinder with water upon completion of said operations; stabilizing means for controlling the buoyancy of said cylinder during evacuation and flooding thereof; reinforcing means carried by said cylinder for releasably supporting said side wall against deformation; and means for locating said pipeline in its landed position.

6. A submergible caisson for underwater operations on a pipeline comprising, in combination, a vertically extending cylinder closed at its lower end and having its side and bottom walls integrally joined to provide a unitary structure; the side wall of said cylinder having a transverse pipe receiving slot formed therein, said slot being spaced below the top of the side wall and above the cylinder bottom to provide a side opening into which a pipe may be introduced in chord-like manner, the slot depth from the side wall toward the vertical axis of the cylinder being at least as great as the diameter of the pipe to be received therein, closure means including a transverse arcuate belt connected to the cylinder normally sealably covering a portion of said transverse slot, the ends of the slot and ends of the belt being arcuate and defining a pair of aligned circular openings, said belt being removable from the cylinder to uncover the slot to permit a pipe to be moved therethrough between positions outside of the cylinder and landed therein upon movement of the cylinder laterally between positions landable to one side of said pipe and landed in surrounding relationship thereto, and means for securing the belt to the cylinder.

References Cited in the file of this patent

UNITED STATES PATENTS

| | | |
|---|---|---|
| 2,667,751 | Osborn | Feb. 2, 1954 |
| 2,812,641 | Elliott | Nov. 12, 1957 |
| 2,939,292 | Law | June 7, 1960 |